(12) United States Patent
Tseng et al.

(10) Patent No.: US 10,764,337 B2
(45) Date of Patent: Sep. 1, 2020

(54) COMMUNICATION SYSTEM AND COMMUNICATION METHOD

(71) Applicant: NATIONAL CHIAO TUNG UNIVERSITY, Hsinchu (TW)

(72) Inventors: Chien-Chao Tseng, Hsinchu (TW); Wei-Cheng Wang, Hsinchu (TW); Sung-Yu Wu, New Taipei (TW)

(73) Assignee: NATIONAL CHIAO TUNG UNIVERSITY, Hsinchu (TW)

( * ) Notice: Subject to any disclaimer, the term of this patent is extended or adjusted under 35 U.S.C. 154(b) by 152 days.

(21) Appl. No.: 16/109,746

(22) Filed: Aug. 23, 2018

(65) Prior Publication Data

US 2019/0327275 A1    Oct. 24, 2019

(30) Foreign Application Priority Data

Apr. 20, 2018    (TW) .............................. 107113608 A (51) Int. Cl.
*G06F 15/16* (2006.01)
*H04L 29/06* (2006.01)
(Continued)

(52) U.S. Cl.
CPC .......... *H04L 65/1069* (2013.01); *H04L 45/04* (2013.01); *H04L 65/40* (2013.01);
(Continued)

(58) Field of Classification Search
CPC . H04L 65/1069; H04L 65/4076; H04L 65/80; H04L 65/40; H04L 45/04; H04L 67/141
See application file for complete search history.

(56) References Cited

U.S. PATENT DOCUMENTS

| | | | |
|---|---|---|---|
| 9,338,096 B2 | 5/2016 | Xu et al. | |
| 2013/0329601 A1* | 12/2013 | Yin | H04L 45/04 370/254 |

(Continued)

FOREIGN PATENT DOCUMENTS

| | | |
|---|---|---|
| CN | 104243196 A | 12/2014 |
| EP | 3145126 A1 | 3/2017 |
| WO | 2018000859 A1 | 1/2018 |

OTHER PUBLICATIONS

Caria et al.; "SDN Partitioning: A Centralized Control Plane for Distributed Routing Protocols"; Apr. 15, 2016; 14 pages (Year: 2016).*

(Continued)

*Primary Examiner* — Richard G Keehn
(74) *Attorney, Agent, or Firm* — CKC & Partners Co., LLC (57) ABSTRACT

A communication method is suitable for use in a network architecture including using a software defined network (SDN) protocol and a legacy network protocol, and includes the following steps. A first sub-domain manage unit of a first SDN sub-domain receives a connection request message corresponding to a multicast source from a client. The first sub-domain manage unit transmits a join request message to a main router of a legacy network domain connected to the first SDN sub-domain when determining that the multicast source is not in the first SDN sub-domain. The first sub-domain manage unit transmits the connection request message to a first domain manage unit of a first SDN domain when the main router determines that the multicast source is not in the legacy network domain. A communication path is established between the client and the multicast source when a location of the multicast source is obtained.

9 Claims, 8 Drawing Sheets

(51) Int. Cl.
H04L 12/715 (2013.01)
H04L 29/08 (2006.01)
(52) U.S. Cl.
CPC .......... H04L 65/4076 (2013.01); H04L 65/80 (2013.01); H04L 67/141 (2013.01)

(56) References Cited

U.S. PATENT DOCUMENTS

| | | |
|---|---|---|
| 2017/0099156 A1 | 4/2017 | Qiu et al. |
| 2018/0227244 A1* | 8/2018 | Zhang ..................... H04L 45/64 |
| 2019/0075041 A1* | 3/2019 | Wang ...................... H04L 45/16 |
| 2019/0097944 A1* | 3/2019 | Kotalwar ................ H04L 45/16 |
| 2019/0296922 A1* | 9/2019 | Dutta ................. H04L 45/745 |
| 2019/0297000 A1* | 9/2019 | Dutta ..................... H04L 45/04 |

OTHER PUBLICATIONS

En-zhong Yang et al., "A video conferencing system based on SDN-enabled SVC multicast," Frontiers of Information Technology & Electronic Engineering, vol. 17, Issue 7, pp. 672-681, 2016.
Florin Coras et al., "Lcast: Software-Defined Inter-Domain Multicast," Computer Networks, vol. 59, Feb. 11, 2014, pp. 153-170.

* cited by examiner

COMMUNICATION SYSTEM AND COMMUNICATION METHOD

PRIORITY CLAIM AND CROSS-REFERENCE

This application claims priority to Taiwan Application Serial Number 107113608, filed Apr. 20, 2018, which is herein incorporated by reference.

BACKGROUND

Technical Field

The present disclosure relates to a communication system. More particularly, the present disclosure relates to the communication system including using a software defined network (SDN) protocol and a legacy network protocol.

Description of Related Art

Nowadays, a multimedia streaming service becomes increasingly important, and thus it is more important for a multimedia multicast streaming service provider regarding how to allocate and manage network bandwidths effectively under a limited hardware infrastructure. Because having the characteristics of centralized network management, a Software Defined Network (SDN) architecture can effectively manage network bandwidths and dynamically establish and manage multicast trees when being applied to the multimedia multicast streaming service, so as to effectively allocate the network bandwidths.

However, most of the conventional network environments mainly use legacy network architectures, and most of the network services are also executed on legacy networks. If the multimedia multicast streaming service is applied under the SDN architecture, effective bandwidth management and dynamic multicast tree management can be achieved, but the effectiveness of its practical applications is limited. In other words, the multimedia streaming service can only be applied in the same SDN domain, and thus a user can only use the multimedia multicast streaming service in the SDN domain and cannot receive the multimedia multicast streaming service from the legacy network.

Therefore, it is a current issue regarding how to design a multimedia multicast streaming service that spans multiple SDN domains and multiple legacy network domains to extend the multicast streaming service range and receive the multicast streaming service from the legacy network domain and other SDN domains, such that the multicast streaming service range will not be limited by the legacy network and the SDN, and the convenience of multicast streaming will be further enhanced.

SUMMARY

The disclosure provides a communication method. The communication method is suitable for use in a network architecture that includes using a software defined network (SDN) protocol and a legacy network protocol. The communication method includes the following steps: receiving a connection request message corresponding to a multicast source transmitted from a client by using a first sub-domain manage unit of a first SDN sub-domain, in which the client is in the first SDN sub-domain; determining whether the multicast source is in the first SDN sub-domain by using the first sub-domain manage unit; transmitting a join request message to a first main router of a first legacy network when the first sub-domain manage unit determines that the multicast source is not in the first SDN sub-domain, in which the join request message is based on a legacy multicast protocol, and the first legacy network is connected to the first SDN sub-domain; determining whether the multicast source is in the first legacy network by using the first main router; transmitting the connection request message to a first domain manage unit of a first SDN domain by using the first sub-domain manage unit when the main router determines that the multicast source is not in the first legacy network, in which the first SON domain includes the first SDN sub-domain and a second SDN sub-domain; and establishing a communication path between the client and the multicast source after a location of the multicast source is obtained.

The disclosure also provides a communication system. The communication system includes SDN domains and legacy network domains. The SDN domains are communicatively coupled to each other, and each of the SDN domains includes SDN domains and a domain manage unit. Each of the SDN domains includes a sub-domain manage unit, and the sub-domain manage unit stores addresses of all communication devices in a corresponding one of the SDN domains. The domain manage unit is configured to manage the SDN domains. Each of the legacy network domains is coupled to a corresponding one of the SDN domains, and a first legacy network domain of the legacy network domains includes a main router storing addresses of all communication devices in the first legacy network domain.

As a result, the present disclosure extends a multicast streaming service range by providing a communication system that spans SDN domains and legacy network domains, such that a client in the communication system can receive the multicast streaming from the legacy network domain, the multicast streaming from the SDN main-domain and the multicast streaming from other legacy network domains (not shown). In other words, the ranges of multicast services will not be limited to legacy networks and SDNs, thus improving the convenience of multicast streaming.

It is to be understood that both the foregoing general description and the following detailed description are demonstrated by examples, and are intended to provide further explanation of the disclosure as claimed.

BRIEF DESCRIPTION OF THE DRAWINGS

The disclosure can be more fully understood by reading the following detailed description of the embodiments, with reference made to the accompanying drawings as follows.

DETAILED DESCRIPTION

The following embodiments are disclosed with accompanying diagrams for detailed description, but the embodiments provided are not intended to limit the scope of the present disclosure. The description of the structure is not used to limit order of execution. Any element regroup structure, which means having equal effect generation, is within the contemplated scope of the present disclosure.

For illustration clarity, many details of practice are explained in the following descriptions. However, it should be understood that these details of practice do not intend to limit the present disclosure. That is, these details of practice are not necessary in parts of embodiments of the present disclosure. Furthermore, for simplifying the drawings, some of the conventional structures and elements are shown with schematic illustrations.

It will be understood that, in the description herein and throughout the claims that follow, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Moreover, "electrically connect" or "connect" can further refer to the interoperation or interaction between two or more elements.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

Figure 1:
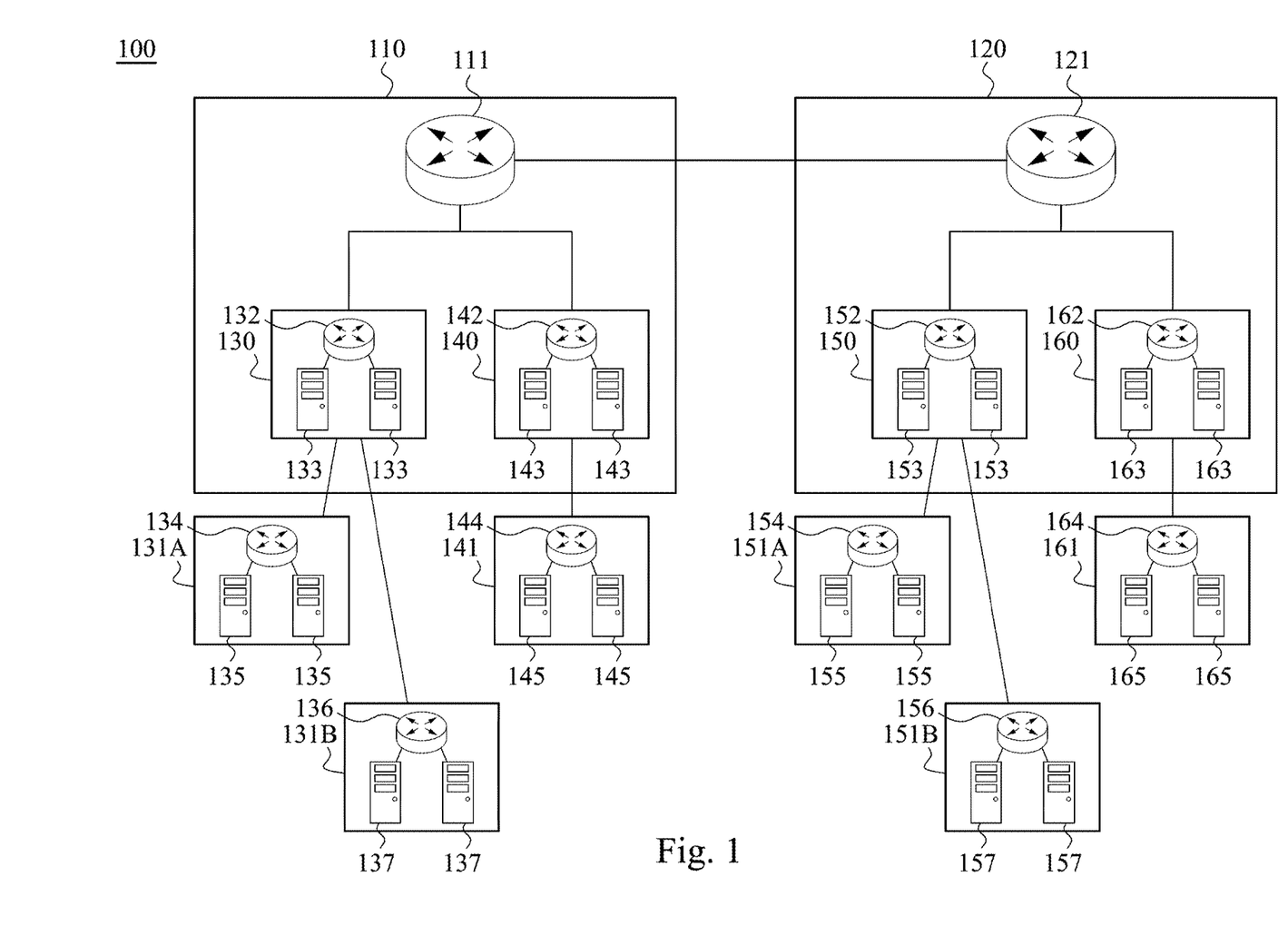
FIG. 1 is a schematic diagram illustrating a communication system according to one embodiment of the disclosure.

FIG. 1 is a schematic diagram illustrating a communication system 100 according to one embodiment of the disclosure. As shown in FIG. 1, in some embodiments, the communication system 100 includes software-defined network (SDN) domains 110 and 120 and legacy network domains 131A, 131B, 141, 151A, 151B and 161, in which the legacy network domains 131A, 131B and 141A are communicatively coupled to the SDN domain 110, and the legacy network domains 151A, 151B and 161A are communicatively coupled to the SDN domain 120.

In the embodiment shown in FIG. 1, the communication system 100 includes, but not limited to, two SDN domains 110 and 120 and six legacy network domains 131A, 131B, 141, 151A, 151B and 161. The communication system 100 may include any number of SDN domains 110/120 and any number of legacy network domains 131A/131B/141/151A/151B/161.

In some embodiments, the SDN domains 110 and 120 are operated under, but not limited to, a SDN protocol. Various centralized network protocols are within the contemplated scope of the present disclosure.

In practical applications, each of the legacy network domains 131A, 131B, 141, 151A, 151B, 161 may be an autonomous system (AS), and the multicast protocol used thereby includes, but not limited to, Protocol Independent Multicast (PIM), Distance Vector Multicast Routing Protocol (DVMRP) and Multicast Open Shortest Path First (MOSPF). Various multicast protocols are within the contemplated scope of the present disclosure.

In some embodiments, the SDN domain 110 includes a domain manage unit 111, and the SDN domain 120 includes a domain manage unit 121. In some embodiments, the domain manage unit 111 is configured to manage all of the SDN sub-domains in the SDN domain 110, and the domain manage unit 121 is configured to manage all of the SDN sub-domains in the SDN domain 120. In brief, each of the domain manage units 111 and 121 may recognize all of the SDN sub-domains in the corresponding one of the SDN domains 110 and 120.

In some embodiments, as shown in FIG. 1, the SDN domain 110 includes SDN sub-domains 130 and 140, and the SDN domain 120 includes SDN sub-domains 150 and 160, in which the SDN sub-domain 130 is communicatively coupled to the legacy network domain 131A and the legacy network domain 131B, the SDN sub-domain 140 is communicatively coupled to the legacy network domain 141, the SDN sub-domain 150 is communicatively coupled to the legacy network domain 151A and the legacy network domain 151B, and the SDN sub-domain 160 is communicatively coupled to the legacy network domain 161.

In some embodiments, the communication method between the SDN sub-domains 130 and 140 and the communication method between the SDN sub-domains 150 and 160 each may adopt a leaf-spine fabric network architecture, in which a leaf of the leaf-spine fabric network architecture is used to connect different SDN sub-domains 130 and 140 or different SDN sub-domains 150 and 160 as a communication bridge between the SDN sub-domains 130 and 140 or between the SDN sub-domains 150 and 160, and as a main channel to the legacy network domain 131A, 131B, 141, 151A, 151B and 161.

In some embodiments, if there exists a legacy network domain 131A, 131B, 141, 151A, 151B or 161 between the SDN sub-domains 130, 140, 150 and/or 160, then the communication method between the SDN sub-domains 130/140/150/160 may adopt a tunneling protocol. However, the communication method between the SDN sub-domains 130 and 140 and the communication method between the SDN sub-domains 150 and 160 are not limited to using the leaf-spine fabric network architecture and the tunneling protocol. Various protocols that may be used as an inter-domain multicast are within the contemplated scope of the present disclosure.

In some embodiments, as shown in FIG. 1, the legacy network domain 131A includes a main router 134 and communication devices 135, the legacy network domain 131B includes a main router 136 and communication devices 137, the legacy network domain 141 includes a main router 144 and communication devices 145, the legacy network domain 151A includes main router 154 and communication devices 155, the legacy network domain 151B includes a main router 156 and communication devices 157, and the legacy network domain 161 includes a main router 164 and communication devices 165.

In some embodiments, the main router 134 stores addresses of all communication devices 135 included in the legacy network domain 131A, the main router 136 stores addresses of all communication devices 137 included in the legacy network domain 131B, the main router 144 stores addresses of all communication devices 145 included in the legacy network domain 141 the main router 154 stores addresses of all communication devices 155 included in the legacy network domain 151A, the main router 156 stores addresses of all communication devices 157 included in the legacy network domain 151B, and the main router 164 stores addresses of all communication devices 165 included in the legacy network domain 161A, in which each of the addresses includes an internet protocol address (IP Address).

In some embodiments, when the legacy network domains 131A, 131B, 141, 151A, 151B and 161 in a Sparse-Mode of Protocol Independent Multicast (PIM-SM) network are used as an example, the main routers 134, 136, 144, 154, 156 and 164 are roots of a multicast tree, the communication devices 135, 137, 145, 155, 157 and 165 are hosts connected to the main routers 134, 136, 144, 154, 156 and 164. In some embodiments, the main routers 134, 136, 144, 154, 156 and 164 may be implemented by rendezvous points (RP) in a PIM network, and the communication devices 135, 137, 145, 155, 157 and 165 may be implemented by designated routers (DR) in the PIM network.

In some embodiments, as shown in FIG. 1, the SDN sub-domain 130 includes a sub-domain manage unit 132 and communication devices 133, the SDN sub-domain 140 includes a sub-domain manage unit 142 and communication devices 143, the SDN sub-domain 150 includes a sub-domain manage unit 152 and communication devices 153, and the SDN sub-domain 160 includes a sub-domain manage unit 162 and communication devices 163.

In some embodiments, the sub-domain manage unit 132 is used to manage the communication devices 133, the sub-domain manage unit 142 is used to manage the communication devices 143, the sub-domain manage unit 152 is used to manage the communication devices 153, and the sub-domain manage unit 162 is used to manage the communication devices 163. In practical applications, each of the sub-domain manage units 132, 142, 152 and 162 has a management list stored therein, in which the management list includes internet addresses of the managed communication devices 133/143/153/163.

In some embodiments, each of the domain manage units 111/121 and the sub-domain manage units 132/142/152/162 stores a routing list, in which the routing list includes an internet address of a client receiving the multicast streaming via the domain manage unit 111 or 121 or the sub-domain manage unit 132, 142, 152 or 162, an internet address of a multicast source and an internet address of a next router which will be passed through. In some embodiments, the router includes one of the domain manage units 111 and 121, one of the sub-domain manage units 132, 142, 152 and 162, one of the main routers 134, 136, 144, 154, 156 and 164, and one of the communication devices 135, 137, 145, 155, 157, 165 connected to the SDN sub-domain 130/140/150/160.

In practical applications, the SDN domain 110 or 120 may be implemented by a campus network of a campus, the SDN sub-domain 130/140/150/160 may be implemented by a network within one building in the campus, the communication device 133/143/153/163 may be implemented by a computer or a router within the budding, but the present disclosure is not limited to the embodiment described herein.

Figure 2:
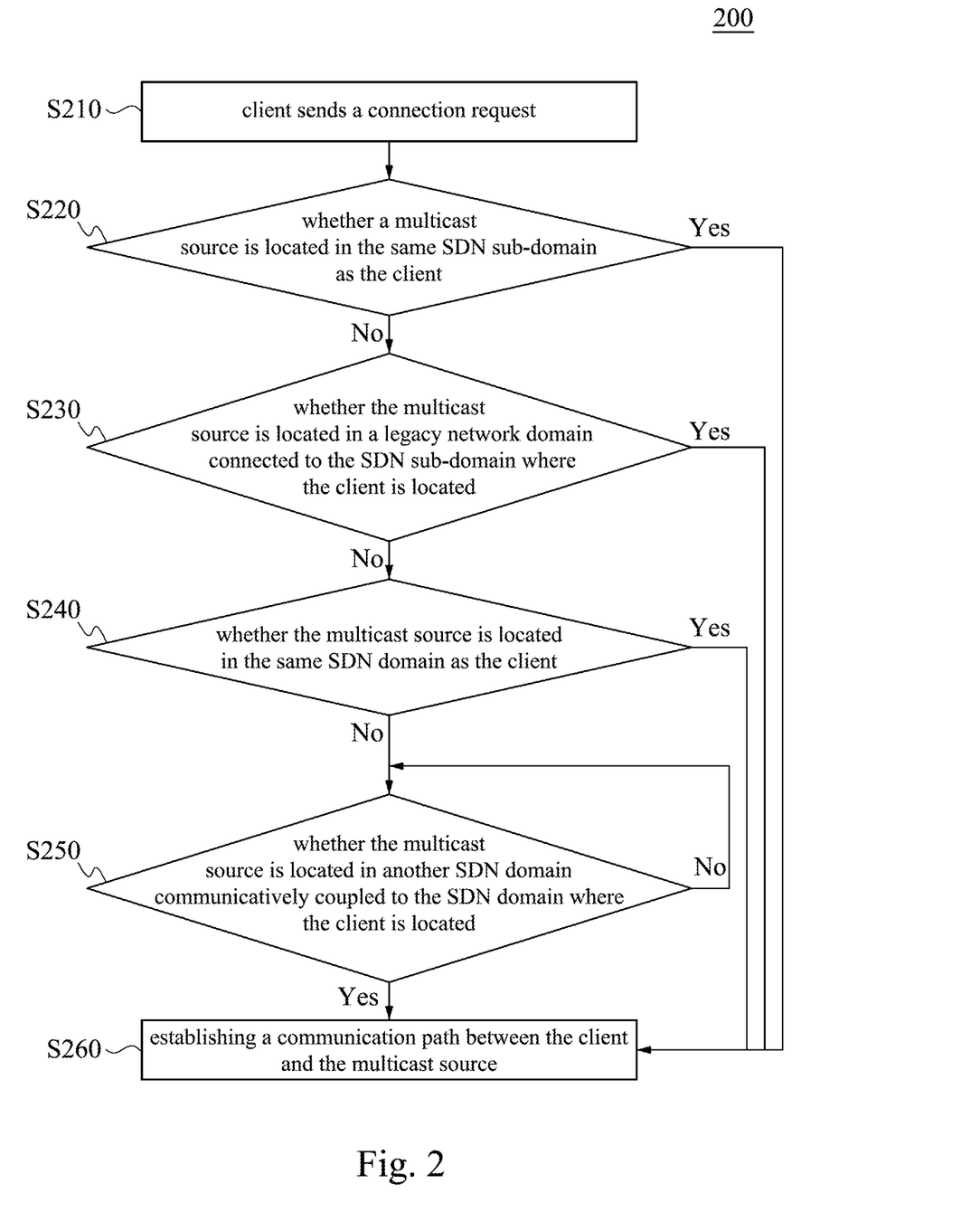
FIG. 2 is a flowchart of a communication method for the communication system shown in FIG. 1 in accordance with one embodiment of the present disclosure.

Details of the present disclosure are described in the following paragraphs with reference to a communication method 200 in FIG. 2, in which FIG. 2 is a flowchart of a communication method 200 of the communication system 100 in FIG. 1 in accordance with one embodiment of the present disclosure. However, the present disclosure is not limited to the following embodiment.

It is noted that the communication method 200 is applicable to a structure that is the same as or similar to the structure of the communication system 100 shown in FIG. 1. To simplify the description below, the embodiment shown in FIG. 1 is used as an example to describe the method of a client receiving the multicast streaming according to an embodiment of the present disclosure. However, the present disclosure is not limited to the embodiment shown in FIG. 1.

Reference is made to FIGS. 1 and 2, when a client requests to receive a video stream from the multicast source, the communication method 200 is performed to search for the location of the multicast source and establish a communication path with the multicast source. The communication method 200 includes the following steps.

In operation S210, the client sends a connection request. In this operation, the client sends a connection request message to a sub-domain manage unit 132, 142, 152 or 162 corresponding to the SDN sub-domain 130, 140, 150 or 160 in which the client located. The connection request message may be an Internet Group Management Protocol Join (IGMP Join).

Then, operation S220 is performed to determine whether a multicast source is located in the same SDN sub-domain with the client. In this operation, one of the sub-domain manage units 132/142/152/162 which receives the connection request message determines whether the multicast source requested by the client to receive the multicast streaming is located in the corresponding SDN sub-domain 130,140,150 or 160.

In some embodiments, the method for determining whether the multicast source is located in the SDN sub-domain 130,140,150 or 160 by using the sub-domain manage unit 132, 142,152 or 162 includes determining whether the multicast source exists in a management list of the sub-domain manage unit 132, 142, 152 or 162. If so, operation S260 is performed to establish a communication path between the client and the multicast source, in which the communication path is an intra-sub-domain multicast path.

In some embodiments, the method for determining whether the multicast source is located in the corresponding SDN sub-domain 130, 140, 150 or 160 by using the sub-domain manage unit 132, 142, 152 or 162 includes determining whether the multicast source is located in the corresponding SDN sub-domain 130, 140, 150 or 160 in accordance with an OpenFlow standard.

If the determination result of operation S220 is "No", operation S230 is subsequently performed.

Operation S230 is performed to determine whether the multicast source is located in the legacy network domain 131A, 131B, 141, 151A, 151B or 161 that is connected to the SDN sub-domain 130, 140, 150 or 160 in which the client is located. In this operation, the sub-domain manage unit 132, 142, 152 or 162 which receives the connection request message converts the connection request message to a join request message used in a legacy network protocol, in which the join request message may be a PIM Join based on a PIM network. The sub-domain manage unit 132, 142, 152 or 162 then transmits the join request message to the corresponding communication device 135, 137, 145, 155, 157 or 165 in the legacy network domain 131A, 131B, 141, 151A, 151B or 161 connected to the SDN sub-domain 130, 140, 150 or 160. The communication device 135, 137, 145, 155, 157 or 165 which receives the join request message transmits the join request message to the corresponding main router 134, 136, 144, 154, 156 or 164. Then, the main router 134, 136, 144, 154, 156 or 164 determines whether the multicast source is located in the corresponding legacy network domain 131A, 131B, 141, 151A, 151B or 161.

If the determination result of operation S230 is "Yes", operation S260 is performed to establish a communication path between the client and the multicast source, in which the communication path is an internet multicast path. In detail, after it is determined that the multicast source is one of the communication devices 135/137/145/155/157/165 in the legacy network domain 131A, 131B, 141, 151A, 151B or 161 in which the main router 134, 136, 144, 154, 156 or 164 is located, the main router 134, 136, 144, 154, 156 or 164 transmits a Source Specific Join message to the multicast source, and the Source Specific Join message may cause each of the passing communication devices 135/137/145/ 155/157/165 to set up a multicast routing forwarding table. After receiving the Source Specific Join message, the multicast source may transmit multicast packets to the corresponding main router 134, 136, 144, 154, 156 or 164 directly to establish the communication path between the client and the multicast source. If the determination result is "No", the main router 134, 136, 144, 154, 156 or 164 transmits a connection reject message to a corresponding sub-domain manage unit 132, 142, 152 or 162 and operation S240 is subsequently performed, in which the connection reject message corresponds to the multicast source that is not located in the corresponding legacy network domain 131A, 1316, 141, 151A, 1518 or 161.

Figure 3:
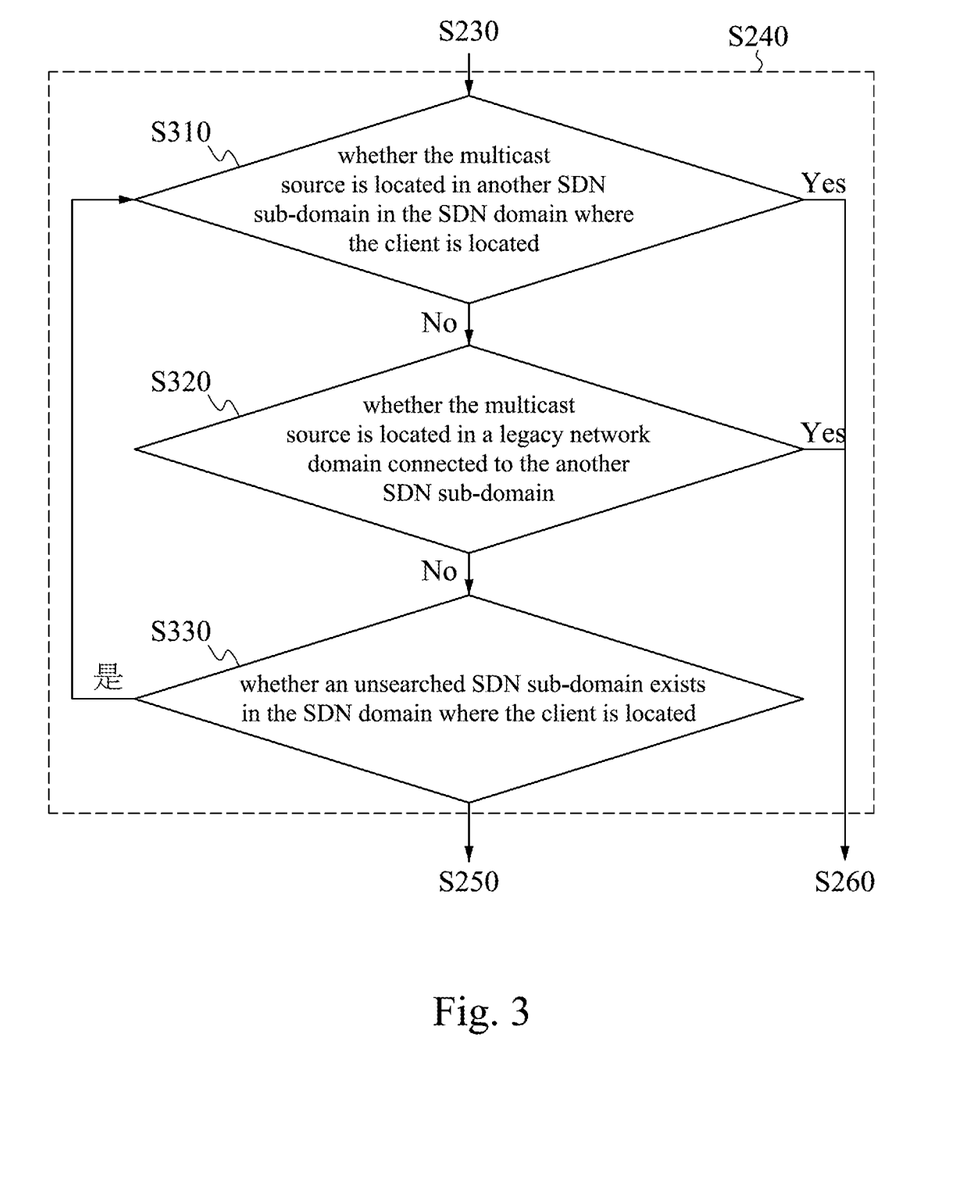
FIG. 3 is a partial flowchart of a communication method in FIG. 2 in accordance with one embodiment of the present disclosure.

Operation S240 is performed to determine whether the multicast source is located in the same SDN domain 110 or 120 with the client. In this operation, after receiving the connection reject message, the sub-domain manage unit 132, 142, 152 or 162 forwards the connection request message to the domain manage unit 111 or 121 corresponding to the SDN domain 110 or 120, and the domain manage unit 111 or 121 determines whether the multicast source is located in the corresponding SDN domain 110 or 120. In some embodiments, detailed operations are described with reference to FIG. 3, in which FIG. 3 is a partial flowchart of operation S240 in the communication method 200 in FIG. 2 in accordance with one embodiment of the present disclosure, in which operation S240 includes operations S310, S320 and S330.

Operation S310 is performed to determine whether the multicast source is located in another SDN sub-domain 130, 140, 150 or 160 in the SDN domain 110 or 120 in which the client is located. In this operation, the domain manage unit 111 or 121 forwards the connection request message to the sub-domain manage unit 132, 142, 152 or 162 corresponding to the another SDN sub-domain 130, 140, 150 or 160, and the sub-domain manage unit 132, 142, 152 or 162 determines whether the multicast source is located in the corresponding SDN sub-domain 130, 140, 150 or 160. If the determination is "Yes", operation S260 is performed to establish a communication path between the client and the multicast source, in which the communication path is an inter-sub-domain multicast path. If the determination is "No", operation S320 is subsequently performed.

Operation S320 is performed to determine whether the multicast source is located in a legacy network domain 131A, 131B, 141, 151A, 151B or 161 connected to the another SDN sub-domain 130, 140, 150 or 160. In this operation, the sub-domain manage unit 132, 142, 152, or 162 which receives the connection request message converts the connection request message to the join request message, and transmits the join request message to the communication device 135, 137, 145, 155, 157 or 165 in the legacy network domain 131A, 131B, 141, 151A, 151B or 161 connected to the corresponding SDN sub-domain 130, 140, 150 or 160. Then, the communication device 135, 137, 145, 155, 157 or 165 forwards the join request message to the corresponding main router 134, 136, 144, 154, 156 or 164, and the main router 134, 136, 144, 154, 156 or 164 determines whether the multicast source is located in the legacy network domain 131A, 131B, 141, 151A, 151B or 161 connected to the another SDN sub-domain 130, 140, 150 or 160. If the determination result is "Yes", operation S260 is performed to establish a communication path between the client and the multicast source, in which the communication path is an internet multicast path. If the determination result is "No", the main router 134, 136, 144, 154, 156 or 164 transmits a connection reject message to a corresponding sub-domain manage unit 132, 142, 152 or 162 and operation S330 is subsequently performed.

Operation S330 is performed to determine whether an unsearched SDN sub-domain 130/140/150/160 exists in the SDN domain 110 or 120 in which the client is located. In this operation, after the sub-domain manage unit 132, 142, 152 or 162 forwards the connection reject message received from the main router 134, 136, 144, 154, 156 or 164 to the domain manage unit 111 or 121, the domain manage unit 111 or 121 determines whether there exists another SDN sub-domain 130/140/150/160 in the managed SDN domain 110 or 120 except the searched two of the SDN sub-domains 130/140/150/160. If the determination is "Yes", operation S310 is performed to continuously search whether the multicast source exists in the another SDN sub-domain 130, 140, 150 or 160, and whether the multicast source exists in the legacy network domain 131A, 131B, 141, 151A, 151B or 161 connected to the another SDN sub-domain 130, 140, 150 or 160. If the determination result is "No", operation S250 is then performed.

In operation S250, determining whether the multicast source is located in another SDN domain 110 or 120 communicatively coupled to the SDN domain 110 or 120 where the client is located. In this operation, the domain manage unit 111 or 121 transmits the connection request message to another domain manage unit 111 or 121 that is on the same hierarchical level and is communicatively coupled to the domain manage unit 111 or 121, and the another domain manage unit 111 or 121 determines whether the multicast source is located in the corresponding SDN domain 110 or 120.

In some embodiments, the mechanism of exchange information of the multicast source between the SDN domains 110/120 includes source probing and source notification. The source probing method is that the domain manage unit 111 or 121 inquires other domain manage unit 111 or 121 about the location of the multicast source when receiving the connection request message. The source notification method is to notify other domain manage unit 111 or 121 that the multicast source has been enabled after the domain manage unit 111 or 121 receives the multicast source enable notification.

Figure 4:
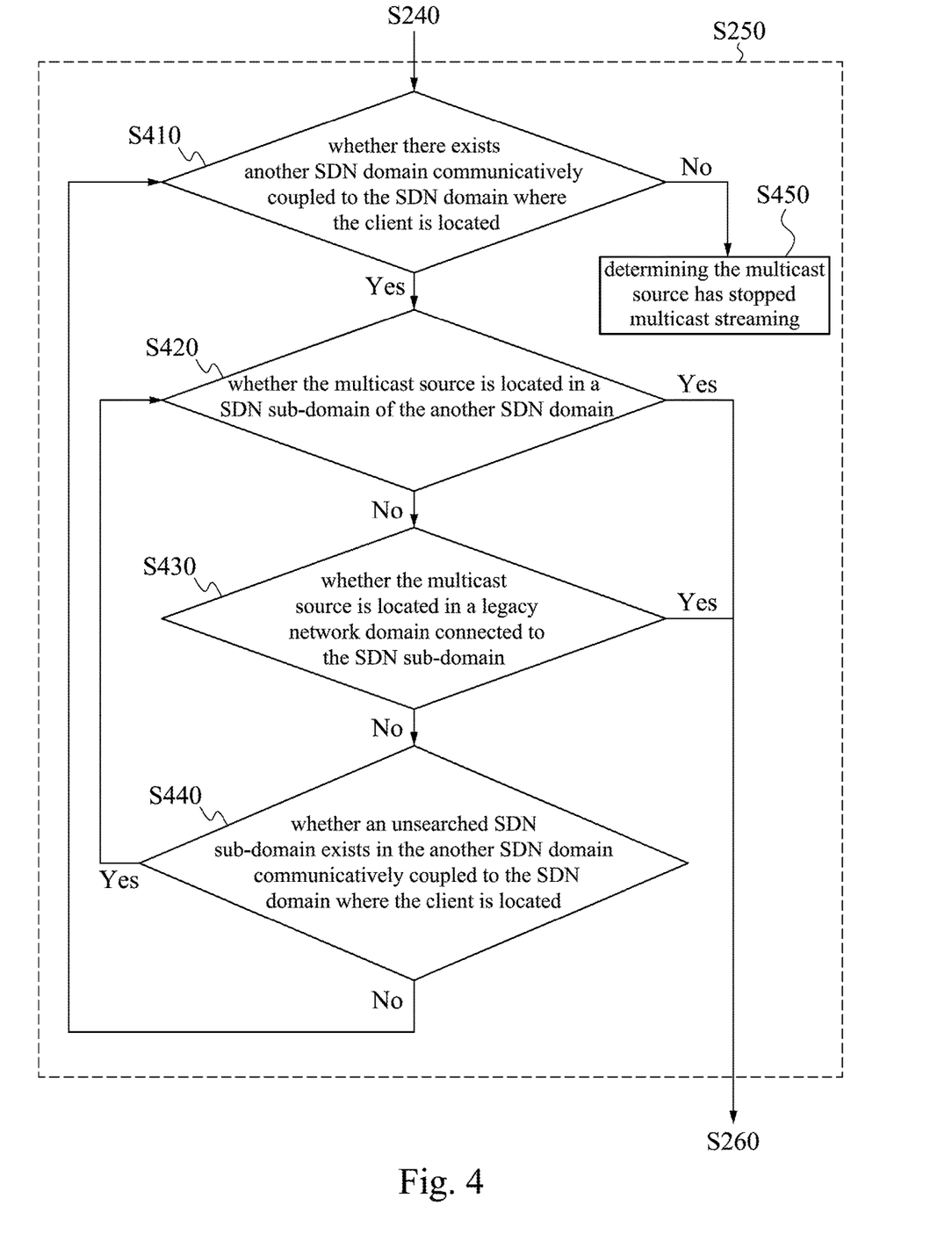
FIG. 4 is a partial flowchart of a communication method in FIG. 2 in accordance with one embodiment of the present disclosure.

In some embodiments, detailed steps are described with reference to FIG. 4, in which FIG. 4 is a partial flowchart of operation S250 in the communication method 200 in FIG. 2, in accordance with one embodiment of the present disclosure, in which operation S250 includes operations S410, S420, S430, S440 and S450.

Operation S410 is performed to determine whether there exists another SDN domain 110 or 120 communicatively coupled to the SDN domain 110 or 120 at which the client is located. In this operation, the domain manage unit 111 or 121 determines whether there exists another SDN domain 110 or 120 communicatively coupled to the SDN domain 110 or 120 at which the client is located by transmitting the connection request message to the domain manage unit 111 or 121 in another SDN domain 110 or 120. If the determination result is "Yes", operation S420 is performed. If the determination result is "No", operation S450 is performed to determine that the multicast source has stopped multicast streaming, and thus the location of the multicast source cannot be found.

In some embodiments, the reason why the SDN domains 110, 120 and the legacy network domains 131A, 131B, 141, 151A, 151B, 161 are searched before operation S450 is that the multicast source may be located in another legacy network domain (not shown) communicatively coupled to the legacy network domain 131A, 131B, 141, 151A, 151B or 161. If the multicast source still cannot be found, operation S450 is performed to determine that the multicast source has stopped multicast streaming.

Operation S420 is performed to determine whether the multicast source is located in the SDN sub-domain 130, 140, 150 or 160 in one of the SDN domains 110, 120. In this operation, the domain manage unit 111 or 121 which receives the connection request message forwards the connection request message to the included sub-domain manage unit 132, 142, 152 or 162 corresponding to the SDN sub-domain 130, 140, 150 or 160, and the sub-domain manage unit 132, 142, 152 or 162 which receives the connection request message determined whether the multicast source is located in the corresponding SDN sub-domain 130, 140, 150 or 160. If the determination result is "Yes", operation S260 is performed to establish a communication path between the client and the multicast source, in which the communication path is an inter-domain multicast path.

If the determination in operation S420 is "No", operation S430 is executed.

In operation S430, determining whether the multicast source is located in a legacy network domain 131A, 131B, 141, 151A, 151B or 161 connected to the SDN sub-domain 130, 140, 150 or 160. In some embodiments, the detail of this operation is similar to operation S320, and will not be discussed herein. If the determination is "Yes", operation S260 is executed to establish a communication path between the client and the multicast source, in which the communication path is an internet multicast path. If the determination is "No", the main router 134, 136, 144, 154, 156 or 164 transmits a connection reject message to the corresponding sub-domain manage unit 132, 142, 152 or 162 and operation S440 is subsequently performed.

In operation S440, determining whether an unsearched SDN sub-domain 130, 140, 150 or 160 exists in another SDN domain 110 or 120 communicatively coupled to the SDN domain 110 or 120 where the client is located. In some embodiments, the detail of this operation is similar to operation S330, and will not be discussed herein. If the determination is "Yes", operation S420 is performed to continuously search for whether there exists the multicast source in the another SDN sub-domain 130, 140, 150 or 160 and operation S430 is then executed to search for whether there exists the multicast source in the legacy network domain 131A, 131B, 141, 151A, 151B or 161 connected to the another SDN sub-domain 130, 140, 150 or 160. If the determination is "No", operation S410 is executed to determine whether there exists another SDN domain 110 or 120 communicatively coupled to the SDN domain 110 or 120 where the client is located.

In operation S260, establishing a communication path between the client and the multicast source. In detail, the multicast source calculates communication path according to the address of the client and sets up a multicast tree such that the client may receive the multicast streaming from the multicast source thereafter.

Figure 5:
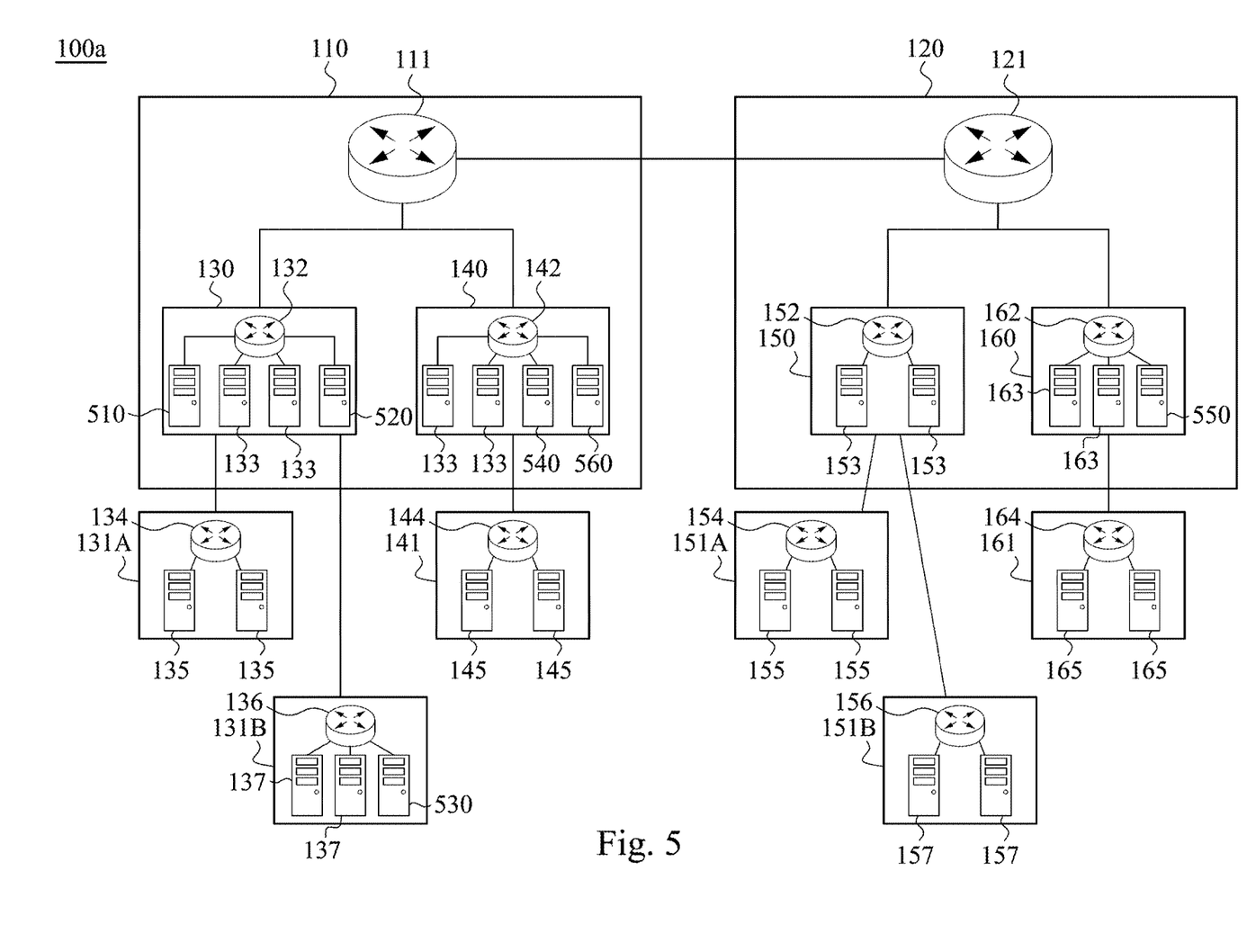
FIG. 5 is a schematic diagram illustrating an example for explaining the communication method in FIG. 2.

FIG. 5 is a schematic diagram illustrating the communication method 200 in FIG. 2 in a demonstrational example.

In one embodiment, the communication system 100a includes the client 510 and the multicast source 520 in addition to the components in the communication system 100. In this embodiment, operation S210 is first executed, the client 510 transmits a connection request message to the sub-domain manage unit 132. Then operation S220 is executed, the sub-domain manage unit 132 determines that the multicast source 520 is located in the SDN sub-domain 130. Operation S260 is then executed to establish a communication path between the client 510 and the multicast source 520, in which the communication path is an intra-sub-domain multicast path.

In one embodiment, the communication system 100a includes the client 510 and the multicast source 530 in addition to the components in the communication system 100. In this embodiment, operation S210 is first executed, in which the client 510 transmits a connection request message to the sub-domain manage unit 132. Then, operation S220 is executed, in which the sub-domain manage unit 132 determined that the multicast source 520 is not located in the SDN sub-domain 130 (i.e., the determination is "No"). Operation S230 is then executed, in which the sub-domain manage unit 132 converts the connection request message to a join request message (e.g., PIM Join) compatible with the legacy network protocol and transmits the join request message to the main router 134 of the legacy network domain 131A and the main router 136 of the legacy network domain 131B simultaneously. Then, the multicast source 530 located in the legacy network domain 131B is found by the main router 136 (i.e., the determination is "Yes"). Then, operation 260 is executed to establish a communication path between the client 510 and the multicast source 530, in which the communication path is an internet multicast path.

In the above embodiment, the main router 134 is a router connected between the legacy network domain 131A and the SDN sub-domain 130, and the main router 136 is a router connected between the legacy network domain 131B and the SDN sub-domain 130, such that the sub-domain manage unit 132 can transmits the join request message to the main routers 134 and 136 directly. By comparison, if the communication device 135 is the router connected to the SDN sub-domain 130 in the legacy network domain 131A, the sub-domain manage unit 132 transmits the join request message to the communication device 135 first, and the communication device 135 then forwards the join request message to the main router 134.

In one embodiment, the communication system 100a includes the client 510 and the multicast source 540 in addition to the components in the communication system 100. In this embodiment, operation S210 is first executed, in which the client 510 transmits the connection request message to the sub-domain manage unit 132. Then, operation S220 is executed, in which the sub-domain manage unit 132 determines that the multicast source 520 is not located in the SDN sub-domain 130 (i.e., the determination is "No"). Operation S230 is then executed, in which the sub-domain manage unit 132 converts the connection request message to a join request message (e.g., PIM Join) compatible with the legacy network protocol and transmits the join request message to the main router 134 of the legacy network domain 131A and the main router 136 of the legacy network domain 131B simultaneously. The main router 134 and the main router 136 determine that the multicast source 520 is not located in the legacy network domain 131A and 131B (i.e., the determination is "No") and transmit a connection reject message to the sub-domain manage unit 132. The sub-domain manage unit 132 then forwards the connection reject message to the domain manage unit 111. Then, operation S310 in operation S240 is executed, the domain manage unit 111 forwards the connection request message to the sub-domain manage unit 142 of the another SDN sub-domain 140, and the sub-domain manage unit 142 determines that the multicast source is located in the corresponding SDN sub-domain 140 (i.e., the determination is "Yes"). Then, operation 260 is executed to establish a communication path between the client 510 and the multicast source 540, in which the communication path is an inter-sub-domain multicast path.

In one embodiment, the communication system 100a includes the client 510 and the multicast source 550 in addition to the components in the communication system 100. In this embodiment, operation S210 is first executed, in which the client 510 transmits the connection request message to the sub-domain manage unit 132. Then, operation S220 is executed, in which the sub-domain manage unit 132 determines that the multicast source 550 is not located in the SDN sub-domain 130 (i.e., the determination is "No"). Operation S230 is then executed, in which the sub-domain manage unit 132 converts the connection request message to a join request message (e.g., PIM Join) compatible with the legacy network protocol and transmits the join request message to the main router 134 of the legacy network domain 131A and the main router 136 of the legacy network domain 131B simultaneously. The main router 134 and the main router 136 determine that the multicast source 550 is not located in the legacy network domain 131A and 131B (i.e., the determination is "No") and transmit a connection reject message to the sub-domain manage unit 132. The sub-domain manage unit 132 then forwards the connection reject message to the domain manage unit 111. Then, operation S240 is executed, in which the domain manage unit 111 determines that the multicast source 550 is not located in the SDN domain 110 (i.e., the determination is "No"). Then, operation S410 in operation S250 is executed, in which the domain manage unit 111 determines that there exists another SDN domain 120 by transmitting the connection request message to the domain manage unit 121 (i.e., the determination is "Yes"). Then, operation S420 is executed, in which the sub-domain manage unit 152 determines that the multicast source 550 is not located in the SDN sub-domain 150 (i.e., the determination is "No"). Then, operation S440 is executed, in which the domain manage unit 121 determines that there exists an unsearched SDN sub-domain 160 in the SDN domain 120 (i.e., the determination is "Yes"). Then, operation S420 is executed, in which the sub-domain manage unit 162 determines that the multicast source 550 is located in the SDN sub-domain 160 (i.e., the determination is "Yes"). Then, operation 260 is executed to establish a communication path between the client 510 and the multicast source 550, in which the communication path is an inter-domain multicast path.

In some embodiments, the aforementioned communication method 200 in FIG. 2 and the demonstrational example in FIG. 5 is based on the client being the first client receiving the multicast streaming in the communication system 100 and the communication system 100a. If the client is not the first client receiving the multicast streaming in the communication system 100 and the communication system 100a, the client can use the established communication path to receive the multicast streaming.

In some embodiments, since it is difficult to determine whether the client is the first client receiving the multicast streaming from the multicast source in the communication system 100 and the communication system 100a, the sub-domain manage unit 132, 142, 152, or 162 or the domain manage unit 111 or 121 may search the stored routing list first when receiving the connection request message, so as to determine whether there is a client connected to the multicast source via the sub-domain manage unit 132, 142, 152, or 162 or the domain manage unit 111 or 121. If there exists other clients in the routing list, the client may establish the communication path between the client and the multicast source according to the routing list. In some embodiments, establishing the communication path between the client and the multicast source includes calculating the communication path and establishing a multicast tree.

In detail, if the multicast source exist in the routing list of the sub-domain manage unit 132, 142, 152, or 162, whether the multicast source is located in the same SDN sub-domain 30, 140, 150 or 160 as the client or located in the legacy network domain 131A, 131B, 141, 151A, 151B or 161 connected to the same SDN sub-domain 130, 140, 150 or 160 as the client, operation S260 can be executed directly to establish the communication path between the client and the multicast source.

For example, reference is made to FIG. 5, in the condition that the communication system 100a includes the client 510 and the multicast source 550 in addition to the components in the communication system 100, when another client 560 being coupled to the communication system 100a and receiving the multicast streaming from the multicast source 550, operations of establishing the communication path between the client 560 and the multicast source 550 are discussed as following.

First, the client 560 transmits the connection request message to the sub-domain manage unit 142 the sub-domain manage unit 142 determines whether there exists another client receiving the multicast streaming from the multicast source 550 via the sub-domain manage unit 142 according to the stored routing list of the sub-domain manage unit 142. After recognizing that the routing information corresponding to the multicast source 550 is not existed in the routing list of the sub-domain manage unit 142, the sub-domain manage unit 142 determines whether the multicast source 550 exists in the SDN sub-domain 140 according to the stored management list. If the determination is "No", the sub-domain manage unit 142 then transmits the join request message to the communication device 145 connected to the SDN sub-domain 140, the communication device 145 transmits the join request message to the main router 144, and the main router 144 determines that the multicast source 550 is not located in the legacy network domain 141, such that the main router 144 transmits the connection reject message to the sub-domain manage unit 142. Then, the sub-domain manage unit 142 transmits the connection request message to the domain manage unit 111, the domain manage unit 111 determines that there exists another client 510 connecting to the multicast source 550 via the domain manage unit 111, the domain manage unit 111 then packages this information as an connection admission message back to the client 560. The client 560 then establishes a communication path with the multicast source 550 based on the connection admission message.

Figure 6:
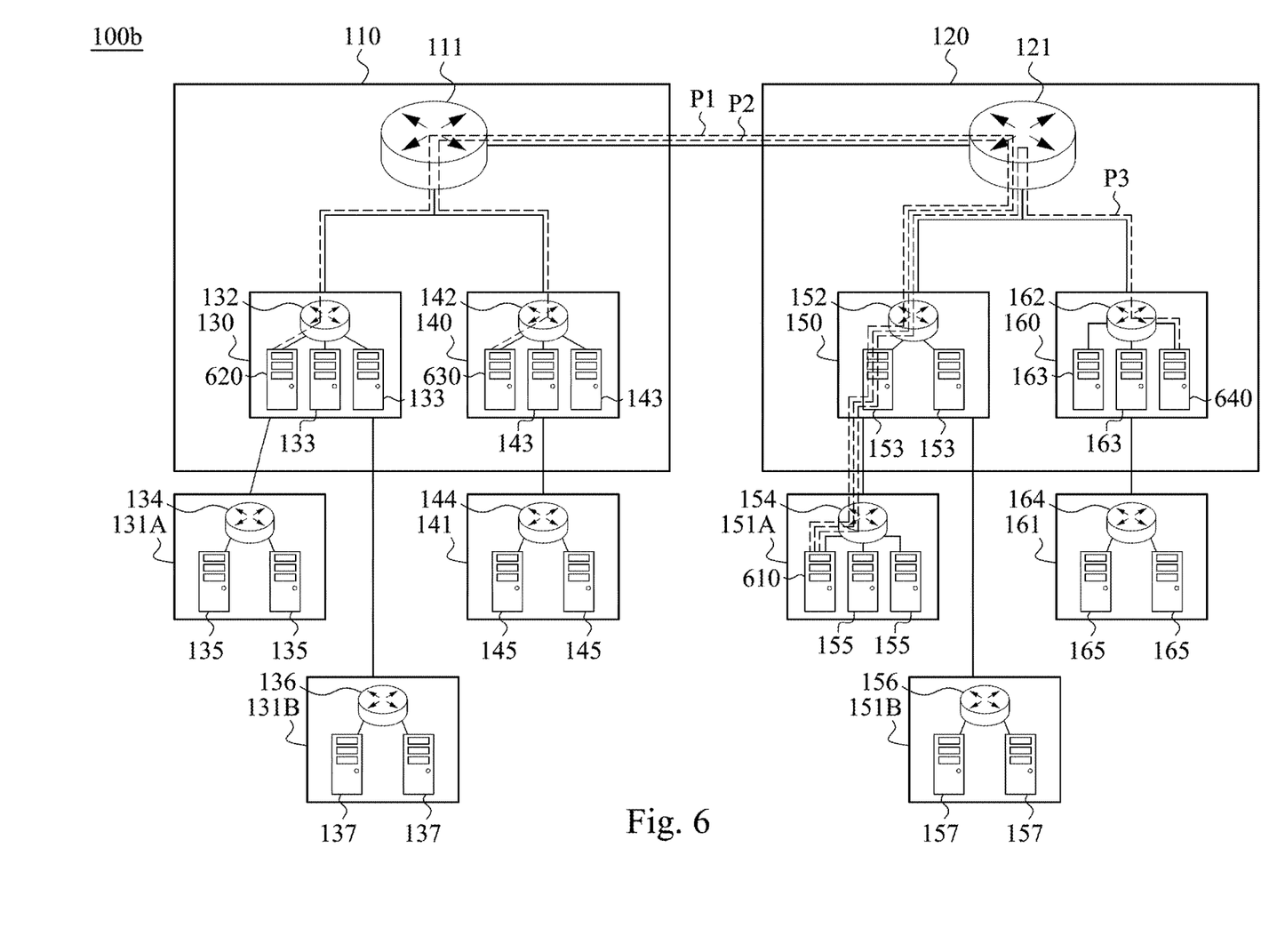
FIG. 6 is a schematic diagram illustrating an example for explaining the communication method in FIG. 2.

FIG. 6 is a schematic diagram illustrating the communication method 200 in FIG. 2 in a demonstrational example.

In some embodiments, the communication system 100b includes multicast source 610, client 620 and client 630 in addition to the components in the communication system 100, in which the client 620 and client 630 receive the multicast streaming from the multicast source 610 simultaneously and there exists a communication path P1 between the client 620 and multicast source 610 and a communication path P2 between the client 630 and the multicast source 610.

In the above embodiment, when the client 620 stops receiving the multicast streaming from the multicast source, a leave message is sent to the sub-domain manage unit 132 to remove the communication path between the client 620 and the domain manage unit 111. When receiving the leave message, the sub-domain manage unit 132 reads the stored routing list. If there is no other clients except the client 620 in the routing list (i.e., the information stored in the routing list has only one internet address corresponding to the client), the communication path between the client 620 and the sub-domain manage unit 132 is removed, and the communication path between the sub-domain manage unit 132 and the domain manage unit 111 is further removed. Then, the sub-domain manage unit 132 forwards the leave message to the domain manage unit 111 and the domain manage unit 111 reads the stored routing list. If the routing list includes the client 630 in addition to the client 620, the communication path between the domain manage unit 111 and the multicast source is reserved.

In some embodiments, the communication system 100b includes the multicast source 610, the client 620 and the client 640 in addition to the components in the communication system 100, in which the client 620 and the client 640 receive the multicast streaming from the multicast source 610 simultaneously, and there exists a communication path P1 between the client 620 and the multicast source 610 and a communication path P3 between the client 640 and the multicast source 610.

In the above embodiment, when the multicast streaming from the multicast source 610 is stopped receiving, the client 620 transmits a leave message to the sub-domain manage unit 132. When receiving the leave message, the sub-domain manage unit 132 reads the stored routing list. If no other clients except the client 620 is stored in the routing list, the communication path between the client 620 and the sub-domain manage unit 132 is removed, and the communication path between the domain manage unit 111 and the sub-domain manage unit 132 is further removed. Then, the sub-domain manage unit 132 forwards the leave message to the domain manage unit 111, and the domain manage unit 111 reads the stored routing list. If no other client except the client 620 is stored in the routing list, the communication path between the domain manage unit 111 and the domain manage unit 121 is removed. Then, the domain manage unit 111 forwards the leave message to the domain manage unit 121, and the domain manage unit 121 reads the stored routing list. If the routing list includes the client 640 in addition to the client 620, the communication path between the domain manage unit 121 and the multicast source 610 is reserved.

As a result, it can be known that even if the client 620, 630 or 640 stops receiving the multicast streaming from the multicast source 610, the communication path between the client 620, 630 or 640 and the multicast source 610 may not be completely removed. Only part of the communication path that is not shared with other clients 620, 630, and 640 will be removed.

Figure 7:
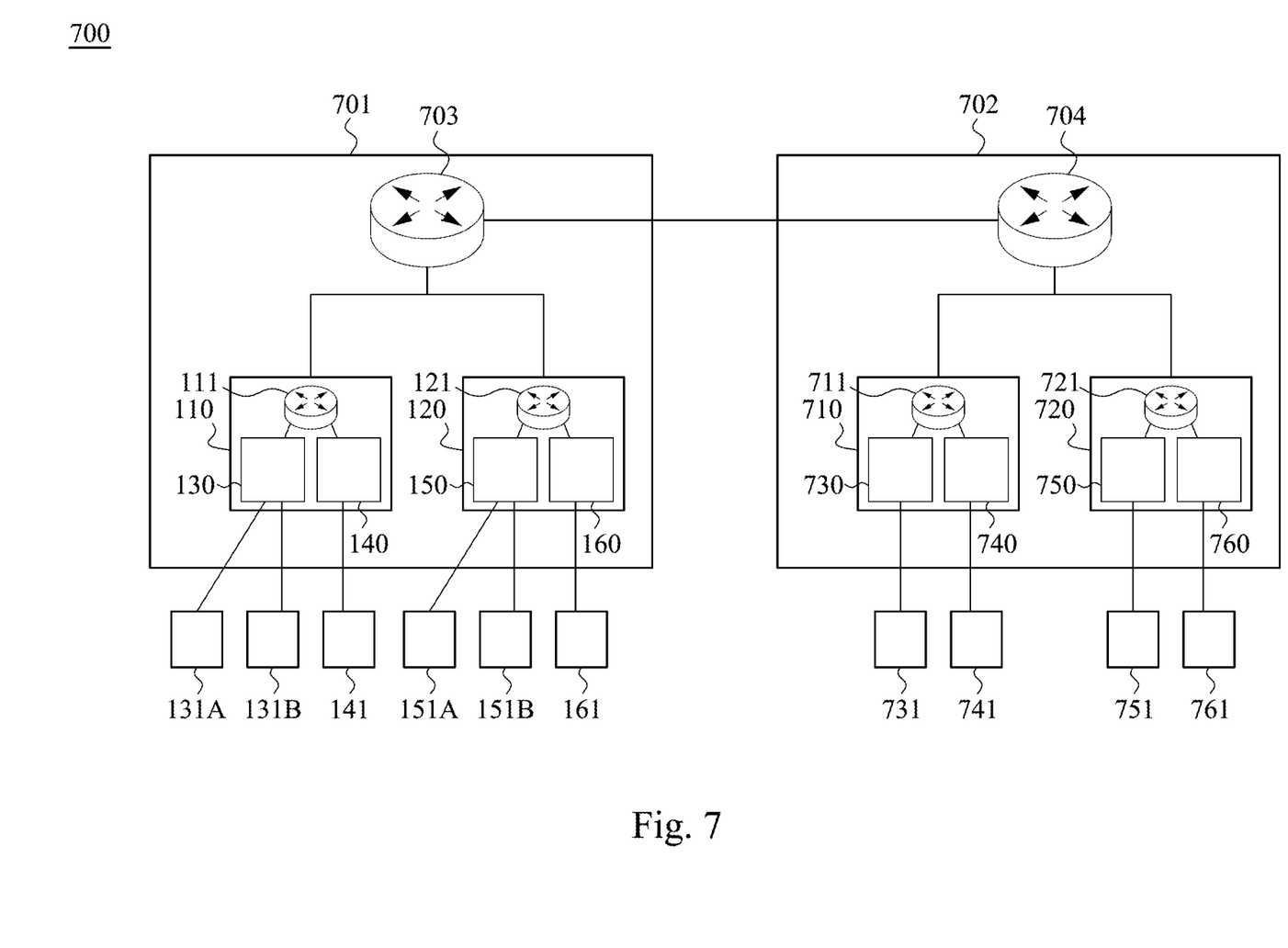
FIG. 7 is a schematic diagram illustrating a communication system according to one embodiment of the disclosure.

Reference is made to FIG. 7, in which FIG. 7 is a schematic diagram illustrating a communication system 700 according to one embodiment of the disclosure. As shown in FIG. 7, in some embodiments, the communication system 700 includes SDN main-domains 701 and 702 and legacy network domains 131A, 131B, 141, 151A, 151B, 161, 731, 741, 751 and 761, in which the legacy network domains 131A, 131B, 141, 151A, 151B and 161 are communicatively coupled to the SDN main-domain 701 and the legacy network domains 731, 741, 751 and 761 are communicatively coupled to the SDN main-domain 702.

In the embodiment shown in FIG. 7, the communication system 700 includes, but not limited to, only two SDN main-domains 701 and 702. The communication system 700 may include any number of SDN main-domains 701 and 702.

In some embodiments, the SDN main-domain 701 includes a main-domain manage unit 703 and SDN domains 110 and 120, and the SDN main-domain 702 includes a main-domain manage unit 704 and SDN domains 710 and 720. In some embodiments, the main-domain manage unit 703 is used to control all SDN domains 110 and 120 in the SDN main-domain 701, and the main-domain manage unit 704 is used to control all SDN domains 710 and 720 in the SDN main-domain 702. In some embodiments, each of the main-domain manage units 703 and 704 includes a management list and a routing list, in which the management list of the main-domain manage unit 703 stores internet addresses of all the SDN domains 110 and 120 in the SDN main-domain 701, the management list of the main-domain manage unit 704 stores internet addresses of all the SDN domains 710 and 720 in the SDN main-domain 702, and the routing list includes an internet address of the client receiving the multicast streaming, an internet address of the multicast source and an internet address of the next router to go through via the main-domain manage unit 703 or 704.

In some embodiments, as shown in FIG. 7, the SDN domain 110 includes a domain manage unit 111 and SDN sub-domains 130 and 140, in which the SDN sub-domain 130 is communicatively coupled to the legacy network domains 131A and 131B, the SDN sub-domain 140 is communicatively coupled to the legacy network domain 141. The SDN domain 120 includes a domain manage unit 121 and SDN sub-domains 150 and 160, in which the SDN sub-domain 150 is communicatively coupled to the legacy network domains 151A and 151B, and the SDN sub-domain 160 is communicatively coupled to the legacy network domain 161. The SDN domain 710 includes a domain manage unit 711 and SDN sub-domains 730 and 740, in which the SDN sub-domain 730 is communicatively coupled to the legacy network domains 731A and 731B, and the SDN sub-domain 740 is communicatively coupled to the legacy network domain 741. The SDN domain 720 includes a domain manage unit 721 and SDN sub-domains 750 and 760, in which the SDN sub-domain 750 is communicatively coupled to the legacy network domains 751A and 751B, and the SDN sub-domain 760 is communicatively coupled to the legacy network domain 761.

In detail, the difference between the communication system 700 and the communication system 100 is that the SDN domains 110 and 120 in the communication system 100 are located in a larger SDN main-domain 701. Alternatively stated, the communication system 700 includes two communication systems 100, such that the communication system 700 is, but not limited to, a three-tier SDN architecture. Any number of tiers of the SDN architecture is within the contemplated scope of the present disclosure.

In practical applications, the SDN main-domain 701 or 702 may be implemented by a domain of a plurality of schools, and the SDN domain 110, 120, 710 or 720 may be implemented by a domain of a campus of one of the schools. The SDN sub-domain 130, 140, 150, 160, 730, 740, 750 or 760 may be implemented by a domain of a building in the campus, but the present disclosure is not limited thereto.

Figure 8:
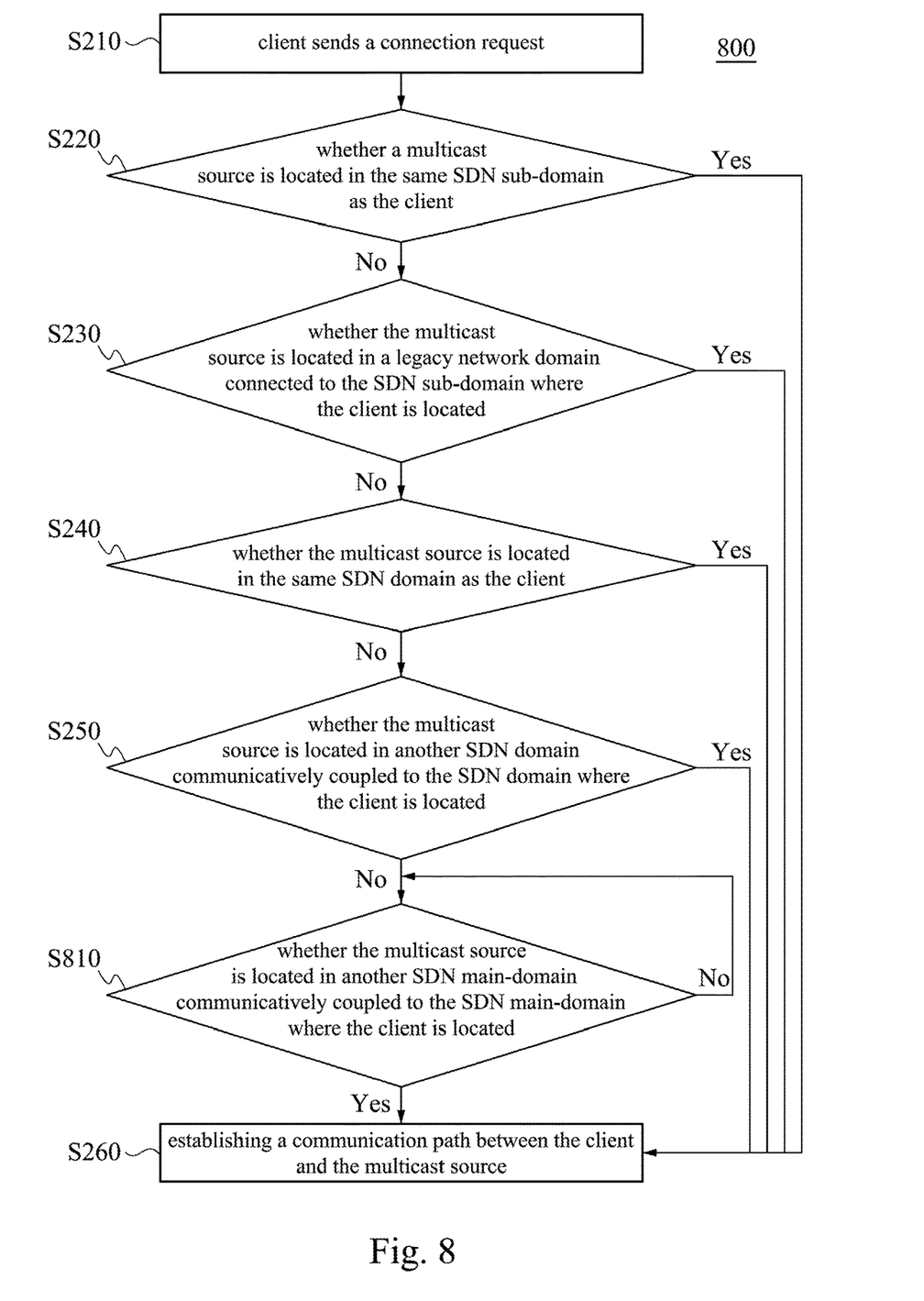
FIG. 8 is a flowchart of a communication method for the communication system shown in FIG. 7 in accordance with one embodiment of the present disclosure.

Reference is made to FIG. 7 and FIG. 8, FIG. 8 is a flowchart of a communication method 800 of the communication system 700 in FIG. 7 in accordance with one embodiment of the present disclosure. The communication method 800 includes operations S210, S220, S230, S240, S250, S810 and S260.

The difference between the communication method 800 in FIG. 8 and the communication method 200 in FIG. 2 is that operation S810 is added to determine whether the multicast source is located in another SDN main-domain 701 or 702 communicatively coupled to the SDN main-domain 701 or 702 in which the client is located. In detail, since the communication system 100 corresponding to the communication method 200 is part of the communication system 700, when the client requests to connect to the multicast source, in addition to searching the corresponding SDN main-domain 701 or 702 and the legacy network domain 131A, 131B, 141, 151A, 151B, 161, 731, 741, 751 or 761 coupled to the corresponding SDN main-domain 701 or 702, it is necessary to search another SDN main-domain 701 or 702 that is communicatively coupled to the corresponding SDN main-domain 701 or 702, and thus operation S810 is needed. Operation S810 is performed to search another SDN main-domain 701 or 702 that is coupled to the corresponding SDN main-domain 701 or 702 and the legacy network domain 131A, 131B, 141, 151A, 151B, 161, 731, 741, 751 or 761 communicatively coupled to the another SDN main-domain 701 or 702 when the multicast source cannot be found in the corresponding SDN main-domains 701 and 702 and the legacy network domains 131A, 131B, 141, 151A, 151B or 161, 731, 741, 751, and 761 coupled to the corresponding SDN main-domain 701 or 702.

In some embodiments, when the multicast source is recognized to be located in another SDN main-domain 701 or 702, a communication path is established between the client and the multicast source, in which the communication path is an inter-main-domain multicast path. If the multicast source is located in the legacy network domain 131A, 131B, 141, 151A, 151B, 161, 731, 741, 751 or 761 communicatively coupled to the another SDN main-domain 701 or 702, a communication path is established between the client and the multicast source, in which the communication path is an internet multicast path.

In some embodiments, when it is known that the multicast source is not located in the SDN main-domains 701 and 702 of the communication system 700, and is not located in the legacy network domains 131A, 131B, 141, 151A, 151B, 161, 731, 741, 751 and 761 communicatively coupled to the SDN main-domains 701 and 702, other legacy network domains (not shown) communicatively coupled to the legacy network domains 131A, 131B, 141, 151A, 151B, 161, 731, 741, 751 and 761 are searched. When the multicast source still cannot be found in the other legacy network domains, it is determined that the multicast source has stopped multicast streaming.

As a result, the present disclosure extends a multicast streaming service range by providing a communication system that spans SDN domains 701 and 702 and legacy network domains 131A, 131B, 141, 151A, 151B, 161, 731, 741, 751 and 761, so that a client located in the communication system 100/700 can receive the multicast streaming from the legacy network domain 131A 131B, 141, 151A, 151B, 161, 731, 741, 751 or 761, the multicast streaming from the SDN main-domain 701 or 702 and the multicast streaming from another legacy network domain (not shown). In other words, the range of multicast services will not be limited to legacy networks and SDNs, thus improving the convenience of multicast streaming.

Although the present disclosure has been described in considerable details with reference to certain embodiments thereof, other embodiments are possible. Therefore, the scope of the appended claims should not be limited to the description of the embodiments contained herein.

What is claimed is:

1. A communication method that is suitable for use in a network architecture including using a software defined network (SDN) protocol and a legacy network protocol, the communication method comprising:

receiving, by a first sub-domain manage unit of a first SDN sub-domain, a connection request message corresponding to a multicast source transmitted from a client, wherein the client is in the first SDN sub-domain;

determining, by the first sub-domain manage unit, whether the multicast source is in the first SDN sub-domain;

transmitting a join request message to a first main router of a first legacy network domain when the first sub-domain manage unit determines that the multicast source is not in the first SDN sub-domain, wherein the join request message is based on a legacy multicast protocol, and the first legacy network domain is connected to the first SDN sub-domain;

determining, by the first main router, whether the multicast source is in the first legacy network domain;

transmitting, by the first sub-domain manage unit, the connection request message to a first domain manage unit of a first SDN domain when the first main router determines that the multicast source is not in the first legacy network domain, wherein the first SDN domain includes the first SDN sub-domain and a second SDN sub-domain; and establishing a communication path between the client and the multicast source after a location of the multicast source is obtained.

2. The communication method as claimed in claim 1, further comprising:

transmitting, by the first domain manage unit, the connection request message to a second sub-domain manage unit of the second SDN sub-domain;

determining, by the second sub-domain manage unit, whether the multicast source is in the second SDN sub-domain; and transmitting, by the second sub-domain manage unit, the join request message to a second main router of a second legacy network domain, so as to determine whether the multicast source is in the second legacy network domain, wherein the second legacy network domain is connected to the second SDN sub-domain.

3. The communication method as claimed in claim 1, further comprising:

transmitting the connection request message to a second domain manage unit of a second SDN domain, so as to determine whether the multicast source is in the second SDN domain when the first domain manage unit determines that the multicast source is not in the first SDN domain.

4. The communication method as claimed in claim 3, further comprising:
transmitting the connection request message to a main-domain manage unit of a SDN main-domain, so as to determine whether the multicast source is in the SDN main-domain when the second domain manage unit determines that the multicast source is not in the second SDN domain, wherein the SDN main-domain comprises the first SDN domain and the second SDN domain.

5. The communication method as claimed in claim 1, wherein each of the first sub-domain manage unit, a second sub-domain manage unit and the first domain manage unit stores a routing list, and the communication method further comprises:
storing an address of the multicast source into the routing list corresponding to the communication path.

6. The communication method as claimed in claim 1, wherein determining whether the multicast source is in the first SDN sub-domain by the first sub-domain manage unit comprises:
reading, by the first sub-domain manage unit, a routing list stored in the first sub-domain manage unit and determining whether an address of the multicast source is stored in the routing list; and
establishing the communication path based on the routing list when the address of the multicast source is stored in the routing list.

7. The communication method as claimed in claim 6, further comprising:
removing the communication path when the client leaves the first SDN sub-domain.

8. A communication system, comprising:
a plurality of software defined network (SDN) domains communicatively coupled to each other, each of the SDN domains comprising:
a plurality of SDN sub-domains, wherein each of the SDN sub-domains comprises a sub-domain manage unit, and the sub-domain manage unit stores addresses of all communication devices in a corresponding one of the SDN sub-domains; and
a domain manage unit configured to manage the SDN sub-domains; and
a plurality of legacy network domains each coupled to a corresponding one of the SDN sub-domains, wherein a first legacy network domain of the legacy network domains comprises:
a main router that stores addresses of all communication devices in the first legacy network domain wherein when receiving a connection request message from a client, a first sub-domain manage unit of a first SDN sub-domain sequentially queries the first sub-domain manage unit, the main router of a corresponding one of the legacy network domains connected to the first SDN sub-domain, a second sub-domain manage unit of a second SDN sub-domain, and a second SDN domain communicatively coupled to the first SDN domain, so as to find out an address of a multicast source corresponding to the connection request message, wherein the second SDN sub-domain and the first SDN sub-domain are in a first SDN domain.

9. A communication system, comprising:
a plurality of software defined network (SDN) domains communicatively coupled to each other, each of the SDN domains comprising:
a plurality of SDN sub-domains, wherein each of the SDN sub-domains comprises a sub-domain manage unit, and the sub-domain manage unit stores addresses of all communication devices in a corresponding one of the SDN sub-domains; and
a domain manage unit configured to manage the SDN sub-domains; and
a plurality of legacy network domains each coupled to a corresponding one of the SDN sub-domains, wherein a first legacy network domain of the legacy network domains comprises:
a main router that stores addresses of all communication devices in the first legacy network domain;
wherein a multicast protocol used by the legacy network domains comprises Protocol Independent Multicast (PIM), Distance Vector Multicast Routing Protocol (DVMRP) and Multicast Open Shortest Path First (MOSPF).

* * * * *